US012056759B1

(12) United States Patent
Durairaj et al.

(10) Patent No.: US 12,056,759 B1
(45) Date of Patent: Aug. 6, 2024

(54) METHOD, MEDIUM, AND SYSTEM FOR AN AUGMENTED REALITY DEVICE MANAGED OBJECT SELECTION AND ACQUISITION PROCESSING

(71) Applicant: UIPCO, LLC, San Antonio, TX (US)

(72) Inventors: Ravi Durairaj, San Antonio, TX (US); Sean C. Mitchem, San Antonio, TX (US); Ruthie Lyle, Durham, NC (US); Nolan Serrao, Plano, TX (US); Nathan L. Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 70 days.

(21) Appl. No.: 17/402,289

(22) Filed: Aug. 13, 2021

Related U.S. Application Data

(60) Provisional application No. 63/065,968, filed on Aug. 14, 2020.

(51) Int. Cl.
| | |
|---|---|
| *G06Q 30/00* | (2023.01) |
| *G06F 3/01* | (2006.01) |
| *G06Q 20/10* | (2012.01) |
| *G06Q 30/0601* | (2023.01) |
| *G06V 20/20* | (2022.01) |
| *G06V 40/18* | (2022.01) |

(52) U.S. Cl.
CPC ......... *G06Q 30/0643* (2013.01); *G06F 3/013* (2013.01); *G06F 3/017* (2013.01); *G06Q 20/10* (2013.01); *G06Q 30/0633* (2013.01); *G06V 20/20* (2022.01); *G06V 40/18* (2022.01)

(58) Field of Classification Search
USPC ....................................................... 705/27.2
See application file for complete search history.

(56) References Cited

U.S. PATENT DOCUMENTS

| | | | | |
|---|---|---|---|---|
| 10,922,733 | B2 * | 2/2021 | Oh ..................... | G06Q 30/0623 |
| 11,238,526 | B1 * | 2/2022 | Le Chevalier ...... | G06F 16/9535 |
| 2013/0297460 | A1 * | 11/2013 | Spivack ............. | G06Q 30/0643 |
| | | | | 705/27.2 |
| 2014/0098130 | A1 * | 4/2014 | Fein ..................... | G06T 19/006 |
| | | | | 345/633 |

(Continued)

OTHER PUBLICATIONS

Z. Rashid, E. Peig and R. Pous, Bringing online shopping experience to offline retail through augmented reality and RFID, 2015, 2015 5th International Conference on the Internet of Things (IOT), pp. 45-51. (Year: 2015).*

*Primary Examiner* — Jeffrey A. Smith
*Assistant Examiner* — Brittany E Bargeon
(74) *Attorney, Agent, or Firm* — Potomac Law Group, PLLC; Dannon G. Allbee

(57) ABSTRACT

The present embodiments relate to augmented reality (AR) device managed object selection and acquisition processing. The client, via a client AR device, can view objects in an environment. The system can process sensor data depicting the environment to identify objects in the environment and determine whether the client has selected a detected object. The system can authenticate an identity of the client (e.g., via iris scanning) and initiate an acquisition process for one or more selected objects. The client can select objects, authenticate the client as an authenticated user, and/or initiate the acquisition process on the AR device directly.

20 Claims, 9 Drawing Sheets

(56) References Cited

U.S. PATENT DOCUMENTS

| | | | |
|---|---|---|---|
| 2015/0073907 A1* | 3/2015 | Purves | G06Q 20/384 |
| | | | 705/14.58 |
| 2016/0364610 A1* | 12/2016 | Jung | G06V 30/248 |
| 2018/0182026 A1* | 6/2018 | Nickerson | G06F 3/16 |
| 2020/0364967 A1* | 11/2020 | Spice | G06F 3/017 |
| 2021/0201029 A1* | 7/2021 | Ju | G06Q 30/0643 |

* cited by examiner

METHOD, MEDIUM, AND SYSTEM FOR AN AUGMENTED REALITY DEVICE MANAGED OBJECT SELECTION AND ACQUISITION PROCESSING

CROSS-REFERENCE TO RELATED APPLICATION

This application is a non-provisional of and claims priority to U.S. Provisional Application No. 63/065,968 filed on Aug. 14, 2020, entitled "AUGMENTED REALITY DEVICE MANAGED OBJECT SELECTION AND ACQUISITION PROCESSING," which is hereby incorporated by reference in its entirety for all purposes.

TECHNICAL FIELD

This disclosure is directed generally to augmented reality systems, and more particularly, to an augmented reality object acquisition experience.

BACKGROUND

Individuals may move about an environment to retrieve desired items. For instance, in a store environment, an individual may retrieve a desired grocery item in the store environment. However, in many instances, the individual may have difficulty finding desired items in an environment, resulting in the individual moving about the environment searching for the desired item. Further, this can result in an individual coming into contact with other individuals in the environment, which can increase a spread of a pathogen (e.g., a virus), for example.

In addition, an individual selecting multiple items in an environment may require a multi-step acquisition process for the selected multiple items. For instance, responsive to retrieving all desired items, the individual can bring the items to a checkout area of the environment. In response, the items can be scanned and added to a listing of acquired items, and the individual can provide account information to acquire the items

Figure 1:
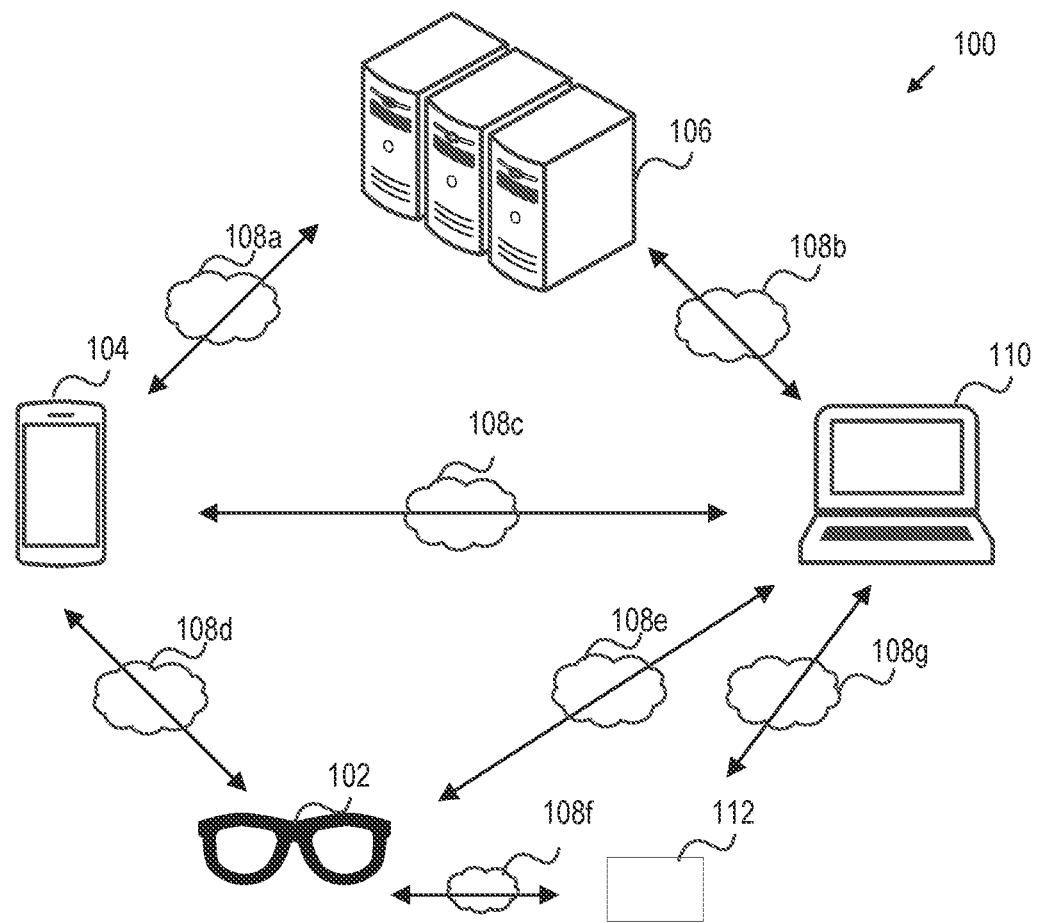
FIG. 1 is a block diagram of an example environment in which the present embodiments are implemented.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

With the emergence of high-throughput wireless networks (e.g., fifth generation (5G) communication networks, Wi-Fi networks), greater data communication and processing capabilities across systems have increased. Augmented Reality (AR) is one functionality that can benefit from increased capabilities on wireless networks. AR (or, similarly, virtual reality (VR)) can incorporate computer-generated information as overlaying a real-world environment. For instance, an AR-enabled headset device can present a real-world environment through a display (e.g., a lens of the AR-enabled headset device) and overlay additional information on the display. In some instances, a system including one or more electronic devices (e.g., an AR-enabled headset, a mobile device, servers) can communicate data between the devices and perform processing tasks to execute various AR-based functions.

The present embodiments relate to an Augmented Reality (AR)-based object acquisition experience. The system as described herein can allow for a user to select an object via an AR-enabled device (e.g., using an eye tracker to track the user's eye) and identify the object (e.g., via a barcode associated with the object). Upon scanning an item, a security application can authenticate the user. Once authenticated, the user can acquire objects (which, as used herein, can also include services or digital objects and values; also referred to herein as "items") using account data specific to the authenticated user.

Further, a user of the present embodiments can efficiently and accurately identify items in an environment. Additionally, the user can purchase items in a store environment securely by authenticating the user and acquiring items for the user without human intervention.

The present embodiments can allow for efficient and contactless confirmation of selected items and initiation of an acquisition process of the selected items. Particularly, the client, via an AR-enabled device, can confirm selection of one or more items by interacting with the AR device (e.g., by tracking eye movements of the client, by detecting gestures performed by the client, by detecting voice commands provided by the user, etc.). This can provide an efficient and contactless method to securely initiate the acquisition process for the selected items. The system can authenticate an identity of a user of the AR device as an authorized user by processing biometric information (e.g., an iris scan) of the user of the AR device.

Some embodiments relate to selection of items and performance of object acquisition tasks using AR-based eye tracking. The user of an AR device can interact with and select computer-generated information presented on an AR device based on eye movements detected by the AR device. For example, after selection of an item, a price and acquisition confirmation prompt can be provided on an AR display of the AR device. In this example, the user can select the confirmation prompt by directing eye movements (or their "gaze") to the portion of the AR display depicting the confirmation prompt. In response to a confirmation from the user, other tasks, such as initiation of an acquisition process for the selected item, can be performed.

Some embodiments relate to selection of items and performance of acquisition tasks using an AR device and an operator device. For instance, an operator device (e.g., a checkout device in a retail environment, which may include a contactless display) can present transfer information (e.g., a price of a selected item) for view by the user via an AR device. The user, via the AR device, can direct their gaze onto the presented transfer information to confirm the transfer information and initiate the acquisition process. The AR device and the operator device can then connect to a digital account (e.g., by connecting to a smart phone of the user or an embedded chip on the user and/or the AR device) to provide transfer information to acquire the selected item.

Some embodiments relate to secure authentication of a user and performance of an acquisition process using an AR device (e.g., AR glasses). An AR device can allow for secure and efficient authentication of a user operating the AR device, such as verifying an iris of the user as an authorized user, for example. During a checkout process, the AR device can provide a unique code that can be obtained by an operator device to uniquely identify the AR device and account details for acquisition of a selected item. To confirm account details or a selection of an item, the AR device can detect a gesture (e.g., a wave of the hand of the user across the operator device, the selected item, and/or the AR device) performed by the user.

Some embodiments relate to performance of a funds transfer process using an AR device. The AR device can include an embedded chip capable of providing details of the transfer to an operator device. This can include presenting account details to an operator device (e.g., by displaying the details on a display of the AR device, wirelessly providing the details to an operator device). The user, via the AR device, can select accounts to transfer from and to by interacting with (e.g., tracking eye movements, gestures, voice commands) the display of the AR device. The user can confirm transfer details and/or initiate the transfer by providing a confirmation action, such as providing a gesture over a transfer prompt on the display of the AR device.

While the present embodiments may utilize items (e.g., grocery items) as an illustrative example, other types of transferable objects, services, or digital items, detectable by the present system, can be detected, transferred, etc., using the embodiments as described herein. Further, while an AR-enabled headset is used as an illustrative example, any electronic device capable of rendering an Augmented Reality display (e.g., a smartphone) can be utilized.

While Augmented Reality devices are used herein for illustrative purposes, in each case, other types of artificial reality or extra reality (XR) devices can be used instead. XR is a form of reality that has been adjusted in some manner before presentation to a user, which may include, e.g., virtual reality (VR), augmented reality (AR) (also known as mixed reality), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers. "Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Augmented reality" can also refers to systems where light entering a user's eye is partially generated by a computing system and partially composes light reflected off objects in the real world. For example, a AR headset could be shaped as a pair of glasses with a pass-through display, which allows light from the real world to pass through a waveguide that simultaneously emits light from a projector in the AR headset, allowing the AR headset to present virtual objects intermixed with the real objects the user can see. "Artificial reality," "extra reality," or "XR," as used herein, refers to any of VR, AR, MR, or any combination or hybrid thereof.

Example Environment Overview

FIG. 1 is a block diagram of an example environment 100 in which the present embodiments are implemented. As shown in FIG. 1, the environment 100 can include an augmented reality (AR) device 102. The AR device 102 can include a network-accessible device capable of overlaying computer-generated information over a depiction of a real-world environment. For instance, the AR device 102 can include a headset that is capable of overlaying data over a display (e.g., glasses, lenses) of the headset. In some embodiments, a mobile device (e.g., a smartphone) can comprise an AR device overlaying data over a depiction of a real-world environment captured via a camera of the smartphone. The AR device 102 can also include a series of sensors capturing data relating to the environment and/or the client operating the AR device 102. The AR device 102 can include a pass-through display that uses, e.g., light projectors such as LASERs, LEDs, etc., cameras, eye-tracking sensors, MEMS components, networking components, etc. The projectors can be coupled to the pass-through display, e.g., via optical elements, to display media to a user. The optical elements can include one or more waveguide assemblies, reflectors, lenses, mirrors, collimators, gratings, etc., for directing light from the projectors to a user's eye. Image data can be transmitted from a processing component. Controllers in the AR device 102 can convert the image data into light pulses from the projectors, which can be transmitted via the optical elements as output light to the user's eye. The output light can mix with light that passes through the pass-through display, allowing the output light to present virtual objects that appear as if they exist in the real world. The AR device 102 can also include motion and position tracking units, cameras, light sources, etc., which allow the AR device 102 to, e.g., track itself in 3DoF or 6DoF, track portions of the user (e.g., hands, feet, head, or other body parts), map virtual objects to appear as stationary as AR device 102 moves, and have virtual objects react to gestures and other real-world objects.

The environment 100 can include a client device 104 comprising a device associated with a client. Client device 104 can include a network-accessible device (e.g., smart phone, computer, tablet, wearable device) capable of communicating data with other devices (e.g., network-accessible server system 106). For instance, the client device 104 can initiate a communication (e.g., phone call, email message, text message) to initiate communication with the AR device 102, entity operator device 110 and/or network-assessible server system 106 via networks 108a-g.

The environment 100 can include a network-accessible server system 106. Network-accessible server system 106 can include one or more interconnected computing devices (e.g., servers) capable of maintaining data and performing processing tasks as described herein. In some embodiments, the network-accessible server system 106 can perform processing tasks as described herein.

Devices in the environment 100 can communicate via networks 108a-g. Network(s) 108a-g can include suitable wired/wireless interfaces allowing for data communication between devices. The network(s) 108a-g can include personal area networks (PANs), local area networks (LANs), wide area networks (WANs), metropolitan area networks (MANs), cellular networks, the Internet, etc. In some instances, the wireless networks can include a short-range wireless communication interface, such as Bluetooth® or Near-Field Communication (NFC), for example.

The environment 100 can include an operator device 110. The operator device 110 can include a device (e.g., a computer, smart phone) associated with an operator associated with the entity. For instance, the operator, via operator device 110, can communicate with the client via a phone call with the client device 104. In some embodiments, the operator device 110 can include a checkout device that can check out a client as described herein.

In some embodiments, the environment 100 can include a micropayment device 112. The micropayment device 112 can include an embedded chip that can provide client-specific information, such as client purchasing/payment information or client authentication information, for example. The micropayment device 112 can be embedded to the user (e.g., embedded to a hand or tip of the finger of the user, embedded below the skin of the user) or appended to an article of clothing of the user. In some instances, the micropayment device 112 can be attached to the AR device 102. The micropayment device 112 can wirelessly provide payment information to facilitate a purchase of an item as described herein.

Figure 2:
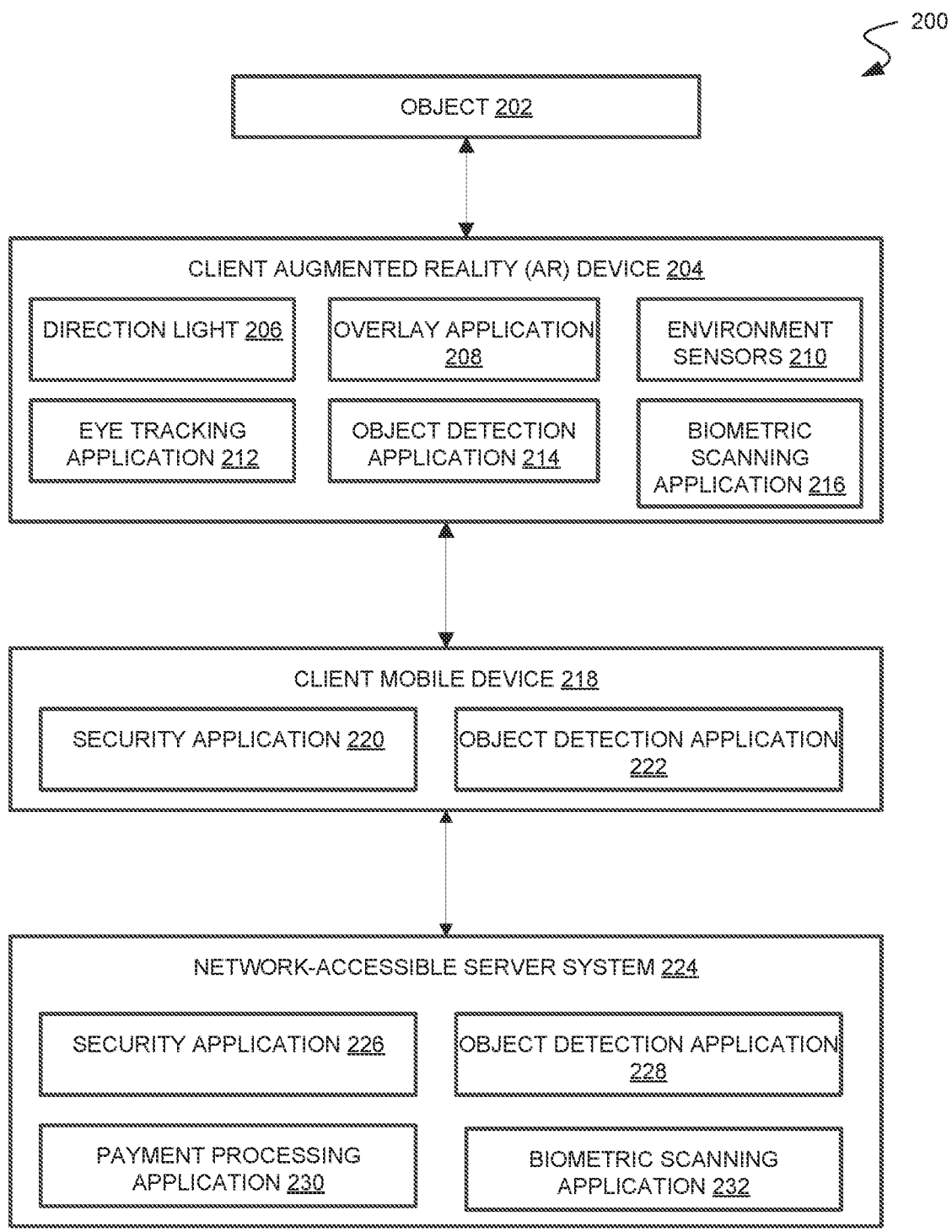
FIG. 2 is a block diagram of an example environment for providing an AR-based object acquisitions experience.

FIG. 2 is a block diagram of an example environment 200 for providing an AR-based object acquisitions experience. As shown in FIG. 2, the environment 200 can include an object 202. The object 202 can include any detectable object in an environment of the AR device 204. For instance, the object 202 can include an item presented in a retail store an indication of a service, a digital display of a digital item, etc. The object 202 can have a series of identifying markings (e.g., unique features, a barcode) that can be used to identify the object 202.

The environment 200 can include a client augmented reality (AR) device 204. The client AR device 204 can include any device that includes components capable of presenting a display that overlays computer-generated information over a real-world environment (or a depiction of the real-world environment). Examples of a client AR device 204 can include an AR-enabled headset (or "smart glasses") or a smartphone.

The client AR device 204 can include a direction light 206. The direction light 206 can include a light that indicates a highlighted or selected area of the real-world environment. The direction light 206 can indicate an area that the client is focusing on (e.g., based on eye movement or head movement of the client). The direction light 206 can be used to select an object 202 to be identified/selected using the techniques as described herein.

The client AR device 204 can include an overlay application 208. The overlay application 208 can overlay computer-generated information over a depiction of a real-world environment. For instance, if the AR device is a headset, the glasses displaying the real-world environment can include data (e.g., information relating to the detected object, a price for the object, a number of items in the cart of the client) displayed with the depiction of the real-world environment.

The client AR device 204 can include environment sensors 210. Environment sensors 210 can include a series of sensors to capture data relating to the environment surrounding the client AR device 204. For instance, environment sensors 210 can capture images/features of the real-world environment, the detected object, etc.

The client AR device 204 can include an eye tracking application 212. The eye tracking application 212 can track movements of the eye of the client and move the direction light 206 based on the movements. The eye tracking application 212 can allow for the client to perform tasks using the eye of the client. For example, the client can perform an action with their eyes to confirm a purchase and perform a second action to cancel a purchase of an item.

The client AR device 204 can include an object detection application 214. The object detection application 214 can process images captured by environment sensors 210 and the direction light 206 to identify an object. The detected object can be processed to perform various tasks as described herein.

The client AR device 204 can include a biometric scanning application 216. The biometric scanning application 216 can obtain biometric data and compare the biometric data with data relating to biometric characteristics of authorized users to determine whether the user of the client AR device 204 is an authorized user. Authorizing the user can be performed prior to performing a purchasing process, for example. Examples of biometric data can include iris/eye information, heartbeat information, walking gait information, facial information, fingerprint information, voice recognition information, a body temperature, etc.

The client AR device 204 can communicate with any of a client mobile device 218 and/or a network-accessible server system 224. Further, any of the client AR device 204, client mobile device 218 and/or network-accessible server system 224 can perform any of the processing tasks as described herein. For instance, data acquired by client AR device 204 can be forwarded to client mobile device 218 or network-accessible server system 224 via a wireless network for processing to identify the object, authenticate the client, and/or securely process payment for the object.

The client mobile device 218 can include a mobile device (e.g., smartphone, wearable device) capable of electronic communication with the client AR device 204 and can assist with performance of processing tasks as described herein. The client mobile device can include a security application 220. The security application 220 can verify an identity of the client and securely process payment requests to purchase detected objects.

The client mobile device 218 can include an object detection application 222 that can process image data from the client AR device 204 to identify the object. The object detection application 222 can compare the object data with a listing of known objects to identify a corresponding object. For instance, the client AR device 204 can scan a barcode of an object and send the data to client mobile device 218. In turn, the client mobile device 218 can identify an object based on the barcode data. Subsequent actions, such as purchasing the object, can be performed responsive to detecting the object.

The environment 200 can include a network-accessible server system 224. The network-accessible server system 224 can obtain data from the client AR device 204 and/or the client mobile device 218 and perform various processing tasks. The network-accessible server system 224 can include a security application 226 to securely authenticate a client and/or securely communicate data to devices in the environment 200.

The network-accessible server system 224 can include an object detection application 228 that can detect objects (e.g., similar to object detection application 214, 222 as described herein). The network-accessible server system 224 can include a payment processing application 230. The payment processing application 230 can process payment for a client using payment information maintained for the client. For instance, upon detection of the object and authentication of the user, the payment processing application 230 can purchase the object of the client using client payment information.

The network-accessible server system 224 can include a biometric scanning application 232 that can obtain biometric information and determine whether the information corresponds with information of an authorized user. The biometric scanning application 232 can include features similar to biometric scanning application 216.

Figure 3:
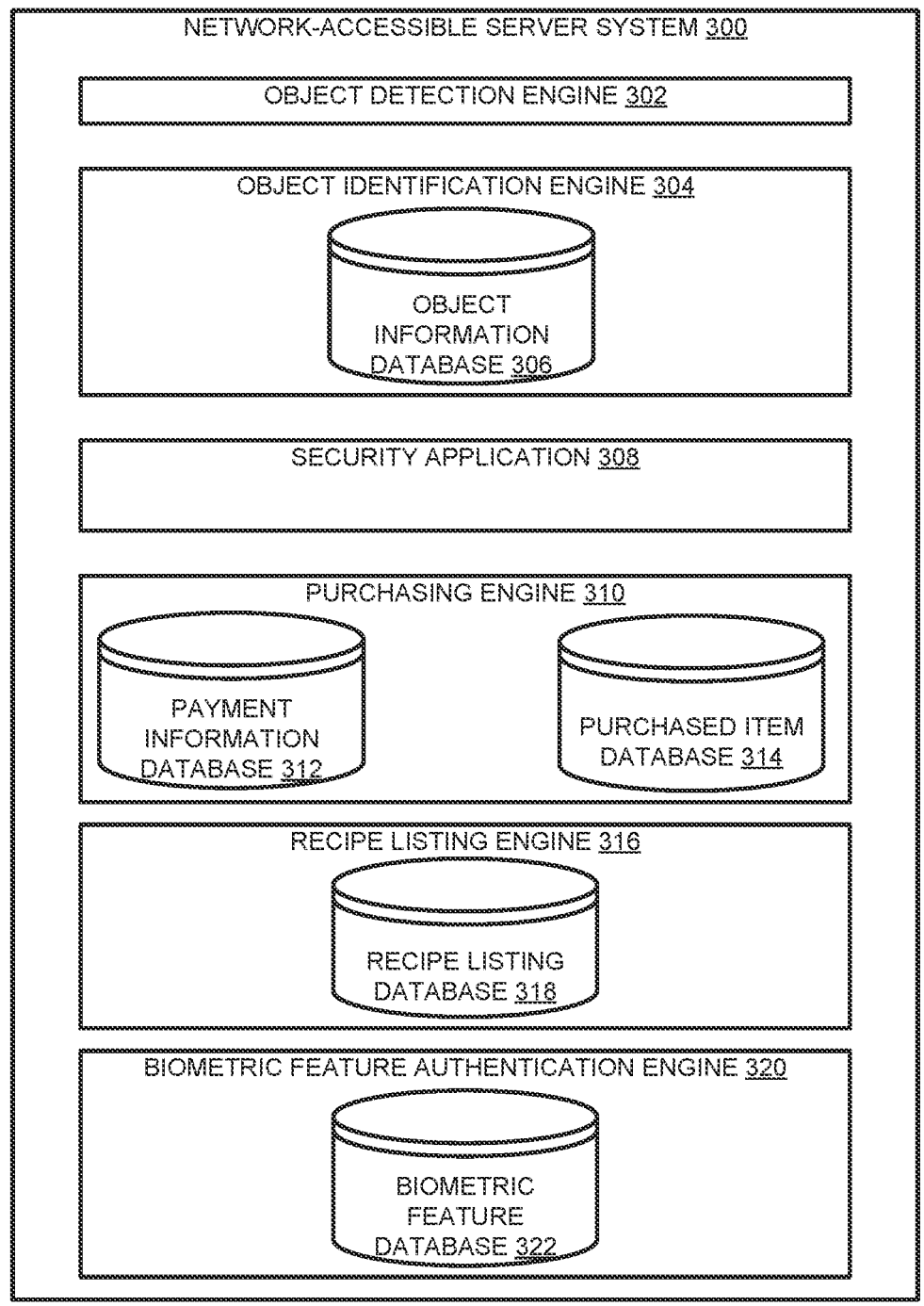
FIG. 3 is a block diagram of an example network-accessible server system.

FIG. 3 is a block diagram of an example network-accessible server system 300. The network-accessible server system 300 may include features similar to network-accessible server system 106 or 224 as described herein.

The network-accessible server system 300 can include an object detection engine 302. The object detection engine 302 can process environmental data captured by sensors (e.g., cameras) disposed on an AR-enabled device to detect one or more objects included in the environment captured by the sensors. For instance, this can include identifying a series of grocery items disposed on a shelf of a retail store. The system can detect an object based on an eye tracking sensor and/or direction light highlighting a portion of the environment focused on by the eye of the client operating the AR device.

In some instances, the object detection engine 302 can process environmental data to detect a number of features indicative of objects. For example, the environmental sensors can capture images depicting a barcode, distinct features of the object, writing on the object, etc. When a number of identifiable features for an object is identified, the features can be processed to identify an object.

The object identification engine 304 can obtain a number of identifiable features of one or more objects and process these identifiable features to identify the object. Particularly, the object identification engine 304 can compare received identifiable features with features included in an object information database 306 to identify an object that corresponds to the features. In some implementations, the object identification engine 304 can accomplish this using a machine learning model trained to identify objects and/or object features. Such a machine learning model can be trained using datasets of objects tagged with identifiers for what the object is and/or characteristics it has.

The object information database 306 can include a series of listings relating to objects included in the environment. For example, the objects include a series of items (e.g., grocery items, hardware tools) for sale in a retail environment. Associated with each object included in the object information database 306 can include any of: features of the object, a barcode associated with the object, a price associated with the object, a location of the object in the retail environment, etc. The database 306 may include information specific to a retail environment.

In some embodiments, the object identification engine 304 can compare features of the detected object with objects listed in the database 306 to identify one or more objects with common features. In some instances, a series of objects can be identified as having common features to the features of the object with a confidence level indicative of a confidence of whether the object included in the database 306 corresponds to the features of the detected object. In such an instance, the object listed in the database 306 with a greatest confidence level can be identified as the identified object.

In some embodiments, feedback data can be received as to whether the object is correctly identified. The feedback data can be fed back into the object identification engine 304 to increase accuracy in subsequent identification of objects. For example, this feedback can be used to retrain or update the training of the machine learning model used by the object identification engine 304. Responsive to identifying an object, data relating to the object can be retrieved from the database 306.

The network-accessible server system 300 can include a security application 308. The security application 308 can authenticate a client prior to performing subsequent actions (e.g., completing a purchasing action). Authenticating a client can include obtaining authentication information and comparing the authentication information with client identifying information to identify the client. The client identifying information can be stored in a client information database.

For example, the client AR device can obtain biometric information of the client (e.g., images depicting an eye or face of the client, a fingerprint of the client, etc.) and send the information to the network-accessible server system 300. The security application 308 can compare the received information with known client biometric information to authenticate the identity of the client. This can prevent unauthorized purchase of items in a retail environment.

In some embodiments, the client, via the client AR device, can detect various identifying motions, phrases, passcodes, etc., that can be used to authenticate the client. For instance, a client can say a keyword or passphrase, or perform a motion unique to the client to verify the identity of the client.

The network-accessible server system 300 can include a purchasing engine 310. The purchasing engine 310 can allow for selection of the object and performing payment processing for the selected item. For instance, a detected item can include a related price and item number. The purchasing engine 310 can then process payment information of the client to purchase the item. In some instances, the purchasing engine 310 only performs purchasing tasks after successful authentication of the identity of the client.

The purchasing engine 310 can obtain client payment information from a payment information database 312. For instance, credit card information and other billing information can be maintained for a client in the payment information database 312.

In some embodiments, the client may purchase a series of items in a retail environment. In these embodiments, upon detection of each object, the item number of the object and a price of the object can be added to a purchased item database 314. Responsive to detecting a completion of purchasing of items (e.g., leaving the retail environment, engaging with a purchasing portal of the retail environment), all items listed in the purchased item database 314 can be purchased using the client payment information.

In some embodiments, the purchasing engine 310 can allow for a purchased item to be cancelled. For instance, if the client makes a statement or makes a specific motion or places the object back on the shelf, the purchasing engine 310 can remove the detected object from the purchased item database 314 and/or remove the object from being purchased using the client purchasing information.

The network-accessible server system 300 can include a recipe listing engine 316. The recipe listing engine 316 can maintain various sets of ingredients or other sets of items related specified for a project. For example, the recipe listing engine 316 can store information relating to a series of ingredients to make a baked good or a series of hardware tools required for a specific construction project.

Further, the recipe listing engine 316 can direct the client, via the client AR device, to items listed on a specified recipe in the retail environment. For instance, this can include providing information on the display of the AR device relating to the specific recipe, items required for the recipe, a location of the items, a path to reach the items, a highlight on the display of the required items, etc. Various recipes or other listings of items can be stored in a recipe listing database 318.

The network-accessible server system 300 can include a biometric feature authentication engine 320. The biometric feature authentication engine 320 can obtain biometric data (e.g., iris image data) of a client operating the AR device and process the data to authenticate the client as an authorized user. For instance, obtained biometric data can be compared with known biometric information of a similar type from a biometric feature database 322. Particularly, the client can be authorized if the obtained biometric data is within a threshold similarity (e.g., includes a threshold number of common features) to the known biometric information.

Figure 4:
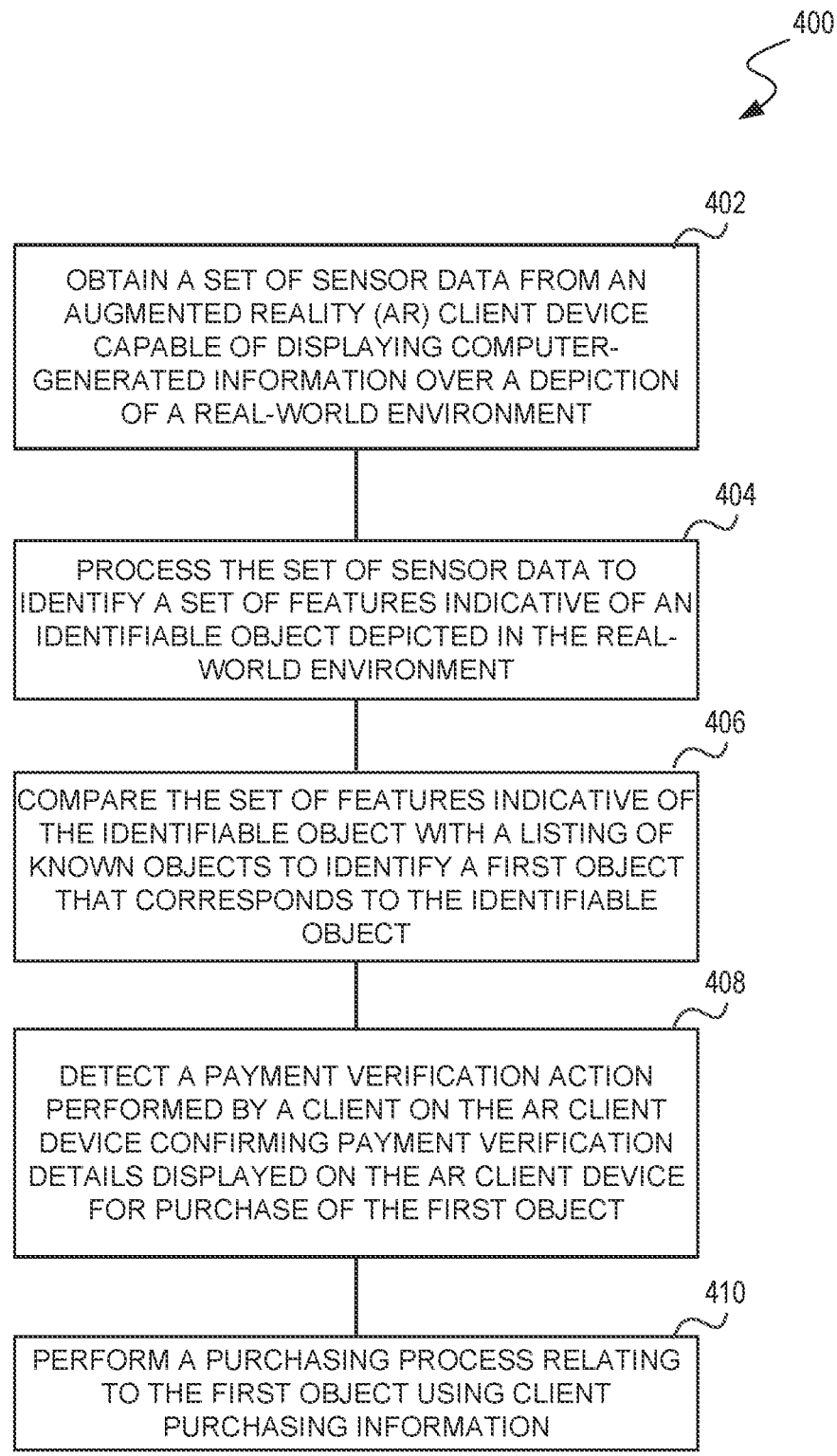
FIG. 4 is a flow process of an example method of detecting an object in an environment and securely processing acquisition of the object.

Example Method for Detecting an Object and Purchasing the Object using an AR device FIG. 4 is a flow process 400 of an example method for detecting an object in an environment and securely processing acquisition of the object. As noted above, a client operating a client AR device can view an object and purchase an object responsive to a selection of the detected object.

The method can include obtaining a stream of sensor data depicting an environment from an AR device (block 402). The stream of sensor data can include data (e.g., images) acquired from a series of sensors on the client AR device. For instance, the client AR device can acquire a series of traditional and/or depth images of an environment surrounding the device. The client AR device can present the environment captured by the sensors on a display of the AR device.

The method can include processing the stream of sensor data to detect one or more identifiable objects (block 404). This can include extracting a series of features depicting objects, wireless signals (e.g., near-field communication signals such as RFID), or barcodes that are indicative of one or more objects. For instance, the system can identify a highlighted portion of the environment (e.g., an area in the environment highlighted by a direction light) and process the area around the highlighted portion to identify features of an object. In some implementations, the object and/or object feature identifications are accomplished by applying a machine learning model trained to identify objects and/or object features. Such a machine learning model can be trained using datasets of objects tagged with identifiers for what the object is and/or characteristics it has. Features of an object can include dimensions of the object, markings on the object, a location of the object, etc.

The method can include comparing the one or more identifiable objects with a listing of objects to identify a detected object in the environment (block 406). This can include comparing features of the identifiable objects with information included in an object database to determine whether an object is included in the environment. The system can identify a number of common features between an identifiable object and an object listed in the object database. Responsive to determining that a threshold number of similar features exist between the identifiable object and the object in the object database, the system can identify the object as a detected object. In some instances, the detection of an object can be associated with a confidence level.

In some embodiments, an identifiable object can include features common to multiple objects. In these embodiments, the confidence level associated with each object in the object database can be used to identify an object that most likely corresponds to the identifiable object. Responsive to detecting the object, various information relating to the object can be retrieved, such as an object name, type, price, etc.

In some embodiments, the method can include authenticating an identity of the client. A security application can acquire client identifying information (e.g., facial information, eye information, a passcode, a motion performed by the client) and authenticate an identity of the client using the client identifying information. This can include comparing the client identifying information with known client information stored in a client information database to verify the identity of the client. In some instances, the purchasing process as described herein is only performed responsive to successfully verifying the identity of the client.

In some embodiments, the method includes authenticating an identity of the client operating the AR client device by determining whether received iris data captured by the AR client device is within a threshold similarity to known iris data of the client. The purchasing process relating to the first object can be performed responsive to determining that the received iris data is within the threshold similarity to known iris data.

Responsive to identification of the first object, the AR device can retrieve details relating to the object (e.g., a price of the object) and present the details relating to the object on the display of the AR device. In some instances, an operator device (e.g., a checkout device) can provide details for all selected objects and payment details (e.g., a total price for all selected objects) that can be presented on the display of the AR device. The AR device can include both information relating to purchase of the selected object(s) and payment information for the client, such as account information for the client, for example. Information presented on the display of the AR device can include prompts that can be selected by a user of the AR device, such as by gesturing to the prompt or directing eye movements over the prompt, which is described in greater detail below.

The method can include detecting a payment verification action, performed by a client on the AR device, confirming payment verification details displayed on the AR client device for purchase of the first object (block 408). This can include receiving from the client, at the AR device, confirmation of payment details for purchase of the first object, indicated by performing an action. For example, the client can direct eye movements to focus on a desired account to purchase the first object and then to direct eye movements over a confirmation prompt to confirm the selection of the first object, indicate those values with a gesture, confirm them with a voice command, etc.

The payment verification action can include detecting that eye movements of the client operating the AR device are focused on a portion of the display of the AR device for a predetermined amount of time. This can include retrieving sensor data indicative of a focal point of an eye movement of the user. The system can map the detected focal point into a portion of the display of the AR device in which the eyes of the user are directed. The system can then identify whether the focal point of the eye movements of the user are directed to (or are within a threshold proximity to) computer-generated data on the display of the AR device. For instance, the system can identify whether the determined focal point of the eye movements of the user are directed onto a confirmation prompt presented on the display of the AR device. Responsive to determining that the focal point of the eye movements of the user are directed onto a confirmation prompt presented on the display of the AR device for a predetermined amount of time (e.g., one second), the system can determine that the user has verified the payment details displayed on the AR device and has confirmed selection of the first object.

In some embodiments, the payment verification action can include detecting a gesture by the user. For instance, a gesture can include a wave of the hand of the user or the hand of the user directed at a prompt displayed on the AR client device. The system can retrieve sensor data identifying the gesture of the user and map the location of the hand of the user relative to the information displayed on the AR device. For instance, the system can identify whether the hand of the user is directed at a portion of the AR device display presenting a confirmation prompt of the payment details for purchase of the first object.

In some embodiments, the payment verification action can include detecting an audio confirmation provided by a voice of the user. For instance, a microphone included in the AR device can obtain audio inputs from the user operating the AR device and process the audio inputs to determine whether a confirmation audio input was provided by the user. The confirmation audio input can include a keyword, phrase, etc., indicating a confirmation of the payment details. For example, the user can say the word "confirm" and the system can determine that the user has confirmed the payment verification details provided on the AR device.

The action performed with respect to the payment verification action can be used to interact with data provided on the AR device and retrieve other information types. For example, the user can review payment accounts and other purchasing information details by interacting with the display of the AR device as described herein. As another example, the user can retrieve common recipes or other commonly associated items associated with the first object. As yet another example, the user can retrieve and review insurance details provided on the AR device by interacting with the display of the AR device as described herein.

In some embodiments, detecting the payment verification action includes any of: identifying that an eye movement directed at a portion of a display of the AR client device displaying the payment verification details, identifying a hand gesture directed at a portion of a display of the AR client device displaying the payment verification details, and/or detecting an audio confirmation provided by the client.

The method can include performing a purchasing process for the detected object (block 410). The purchasing process can be initiated based on detecting a selection action. For example, a selection action can include placing a detected object in a card, detecting a motion (e.g., a swiping motion) by the client, detecting a phrase spoken by the client, detecting that the client has exited the retail environment, detecting an engagement of the client AR device with an operator device (e.g., the client AR device being within a threshold proximity to a checkout station), etc.

In some embodiments, the client can perform a second action to cancel a selection of an item. For instance, upon detecting that the object is placed onto the shelf or detecting a motion from the client, the system can remove the object from a listing of objects to be purchased during the purchasing process.

The purchasing process can include retrieving client payment information (e.g., billing address, credit card information, other payment information) from a payment information database. The payment information can be used to process payment of one or more items selected for purchase by the client. The system can retrieve prices for all selected items and process a purchase for the items for the total cost of all selected items (with any additional prices added to the total cost). The system can internally process the payment or transmit a request for payment to a third-party payment processor.

In some embodiments, the client purchasing information is provided by any of a mobile device in electrical communication with the AR client device or a payment device included in the AR client device. The mobile device can execute an application providing client purchasing information wirelessly to an operator device or to a network-accessible server system for initiating a funds transfer process to purchase the first object. In some instances, the AR device can include an embedded chip and/or transceiver (e.g., near-field communication transmitter) uniquely identifying the AR device and providing client payment information for performing the purchasing process. The embedded chip can be embedded in the AR device, a peripheral device in communication with the AR device, or in a hand/finger of the user, for example.

In some embodiments, the method includes identifying that payment verification details are presented on an operator device and included on the display of the AR client device, wherein the detection of the payment verification action includes identifying an eye movement directed at a portion of the display of the AR client device depicting the payment verification details presented by the operator device.

In some embodiments, the AR client device includes a client-specific identifier unique to the client, wherein an operator device is configured to retrieve the client purchasing information based on the client-specific identifier of the AR client device.

In some embodiments, performing the purchasing process further comprises retrieving payment receipt details from an operator device in electronic communication with the AR client device, identifying the client purchasing information from a micropayment device embedded in the AR client device, and initiating a funds transfer process using on the payment verification details to transfer a payment from an account associated with the client purchasing information to an account derived from the payment receipt details.

Selecting an Object and Initiating a Purchasing Process based on Eye Movements on an AR Device As noted above, the prevalence of high-throughput networks has increased computational efficiency and resources available for performing processing tasks. This can allow for increased processing capability for AR-enabled systems and devices. In some embodiments of the present disclosure, an AR-enabled system as described herein can utilize eye tracking of a user of an AR device to select an object and initiate a purchasing process for that object.

The AR device can obtain a set of sensor data from an Augmented Reality (AR) client device capable of displaying computer-generated information over a depiction of a real-world environment. For instance, this can include a depicting a real-world environment including several detectable items in a retail environment. The AR device can overlay computer-generated information over portions of the depiction of the real-world environment portrayed on the display of the AR device.

The system as described herein can process the set of sensor data to identify a set of features indicative of an identifiable object depicted in the real-world environment and compare the set of features indicative of the identifiable object with a listing of known objects to identify a first object that corresponds to the identifiable object. For instance, the AR device can detect a grocery item (e.g., a cereal box) and compare features of the item with known grocery item types specific to that retail environment to identify the grocery item as a cereal box.

The AR device can update the display to present first object payment details over the depiction of the real-world environment. This can include providing a price of the first object on the display of the AR device, for example.

In some implementations, the system can identify that an eye movement is directed at a first portion of a display of the AR client device displaying the first object payment details for a predetermined amount of time. For example, sensors of the AR device can track a position of eye movements so that a focal point or direction of the eye movements of the user can be detected. The system can determine a portion of the display (e.g., lenses on AR-enabled glasses) that the user is viewing.

Responsive to identifying that the eye movement is directed, for the predetermined amount of time, at the first portion of the display displaying the payment details, the system can perform a purchasing process relating to the first object using client purchasing information.

In other implementations, the system can use one or more of eye movement tracking, gesture-recognition, and voice control using AR glasses to provide different capabilities for selection of objects, confirmation of the selection, authentication of the user, and/or initiation of the purchasing process.

The AR device can connect to an operator device and/or a banking application for payment. For instance, the user via the AR device can interact with any of the operator device and/or the banking application to modify or confirm various payment details. In some embodiments, the AR device can access and retrieve data from various third-party sources, such as social media platforms, retail environment platforms, etc., to provide an interactive and frictionless item selection and payment verification process.

The AR device (e.g., AR-enabled glasses) can be connected to smartphones for performing processing tasks as described herein. In some instances, any of the AR device and/or the smartphone can forward data to a network-accessible server system for process as described herein. Users can access banking services on the AR glasses through voice, gestures, and/or gaze (eye tracking), performing tasks more efficiently, intuitively, and swiftly, leading to an enhanced user experience. The user could also initiate insurance claims, check a status of claims, upload photos, and perform other insurance-related activities through the AR glasses.

Figure 5:
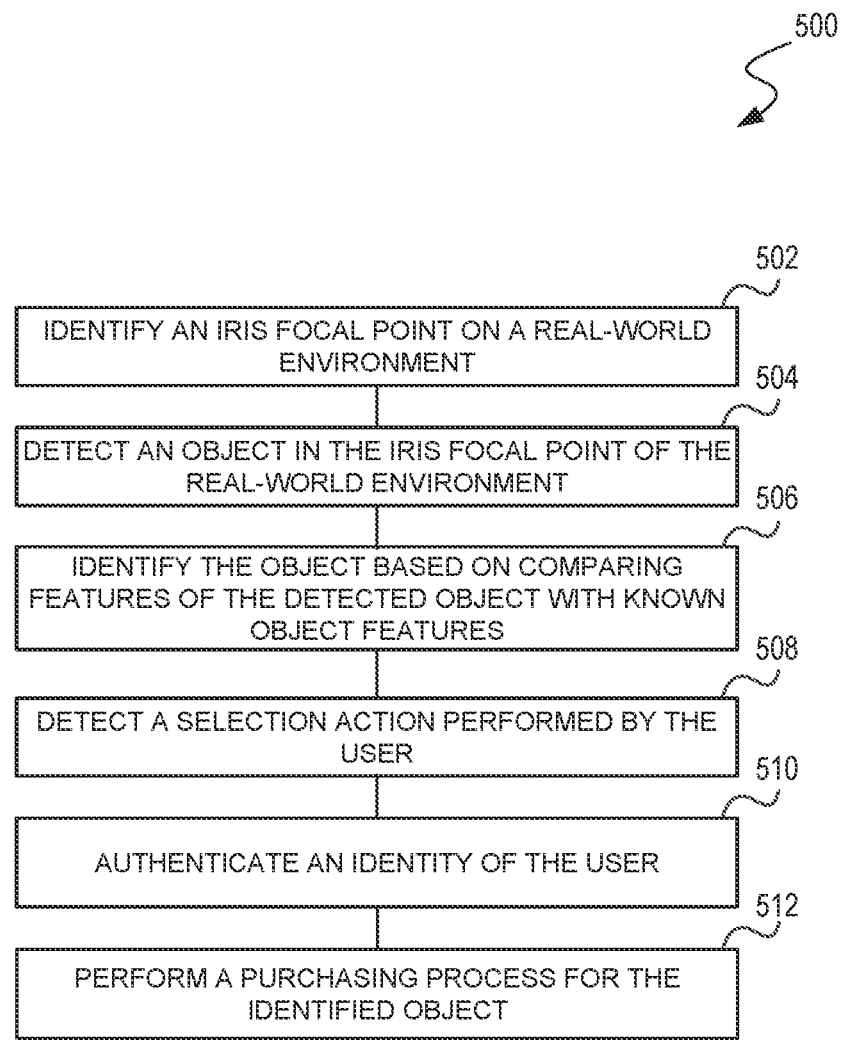
FIG. 5 is a block diagram of an example method for selecting an object and performing an acquisition process using an AR device.

FIG. 5 is a block diagram of an example method 500 for selecting an object and performing an acquisition process using an AR device. The method can include identifying an iris focal point on a real-world environment (block 502). This can include processing sensor data to identify a direction or focal point of the iris/eyes of the user. The direction/focal point of the eyes of the user can be mapped to the real-world environment depicted in the display (e.g., lenses) of the AR device to identify a position in the real-world environment that the user is viewing.

The method can include detecting an object in the iris focal point of the real-world environment (block 504). This can include processing images of the real-world environment to identify any detectable objects in the real-world environment. This can also include, for example, identifying various grocery items located on a shelf in a retail environment. The system can detect objects within a threshold proximity to the derived focal point.

The method can include identifying the object based on comparing features of the detected object with known object features (block 506). The detected objects can be labelled in the real-world environment so as to identify the objects as the focal point of the eyes of the user move about the real-world environment.

The method can include detecting a selection action performed by the user (block 508). The selection action can include detecting that the focal point of the eyes of the user are focused on a portion of the display for a predetermined period of time, a gesture, and/or an audio input as described herein.

In some embodiments, a payment verification action performed by the client on the AR client device can be identified confirming payment verification details displayed on the AR client device for purchase of the first object. The payment verification action can include a hand gesture directed at a second portion of the display of the AR client device displaying the payment verification details.

The method can include authenticating an identity of the user (block 510). Authenticating the identity of the user can include comparing iris information retrieved by the system with known iris data of authorized users to determine whether the user of the AR device is an authorized user. If the received iris information is within a threshold similarity to known iris data of an authorized user, the system can authenticate the identity of the user as an authorized user.

The method can include performing a purchasing process for the identified object (block 512). The purchasing process can include transferring funds from an account associated with the user to an account associated with the operator (e.g., a retail environment).

In some embodiments, performing the purchasing process can include forwarding a purchasing request to a mobile device configured to forward the purchasing request to a payment processing server, wherein the purchasing request includes the client purchasing information and the first object payment details.

In some embodiment, the method can include retrieving client-specific account information using the client purchasing information. The client-specific account information can be included in the client purchasing information and retrieved from any of a mobile device in communication with the AR device and/or a chip associated with the user as described herein. The display of the AR client device can be updated to display the client-specific account information. The AR client device can allow for selection of an account included in the client-specific account information by detecting that eye movement, a gesture, a voice command, etc. indicates an account.

Authentication of Payment Details Provided by Operator device by an AR Device

In some embodiments, the operator device can provide payment details on a display of the operator device. The operator device can provide an indicator (e.g., a set of digital eyes) to request the view of the client operating the AR device through lenses of the AR device. The client, via the AR device, can then view the payment information through the lenses of the AR device and confirm the payment information to initiate a payment process. Client-specific payment information can be provided by a smartphone associated with the client or the AR device.

The AR glasses could start the digital wallet payment with an iris scan for biometric authentication and then follow the direction of the gaze of the client towards the item they're planning to purchase. The AR glasses can light up the path to the contactless reader that the client is looking at. Iris scanning biometrics can include measuring the unique patterns in the iris of the eye to verify and authenticate an identity of the user.

Figure 6:
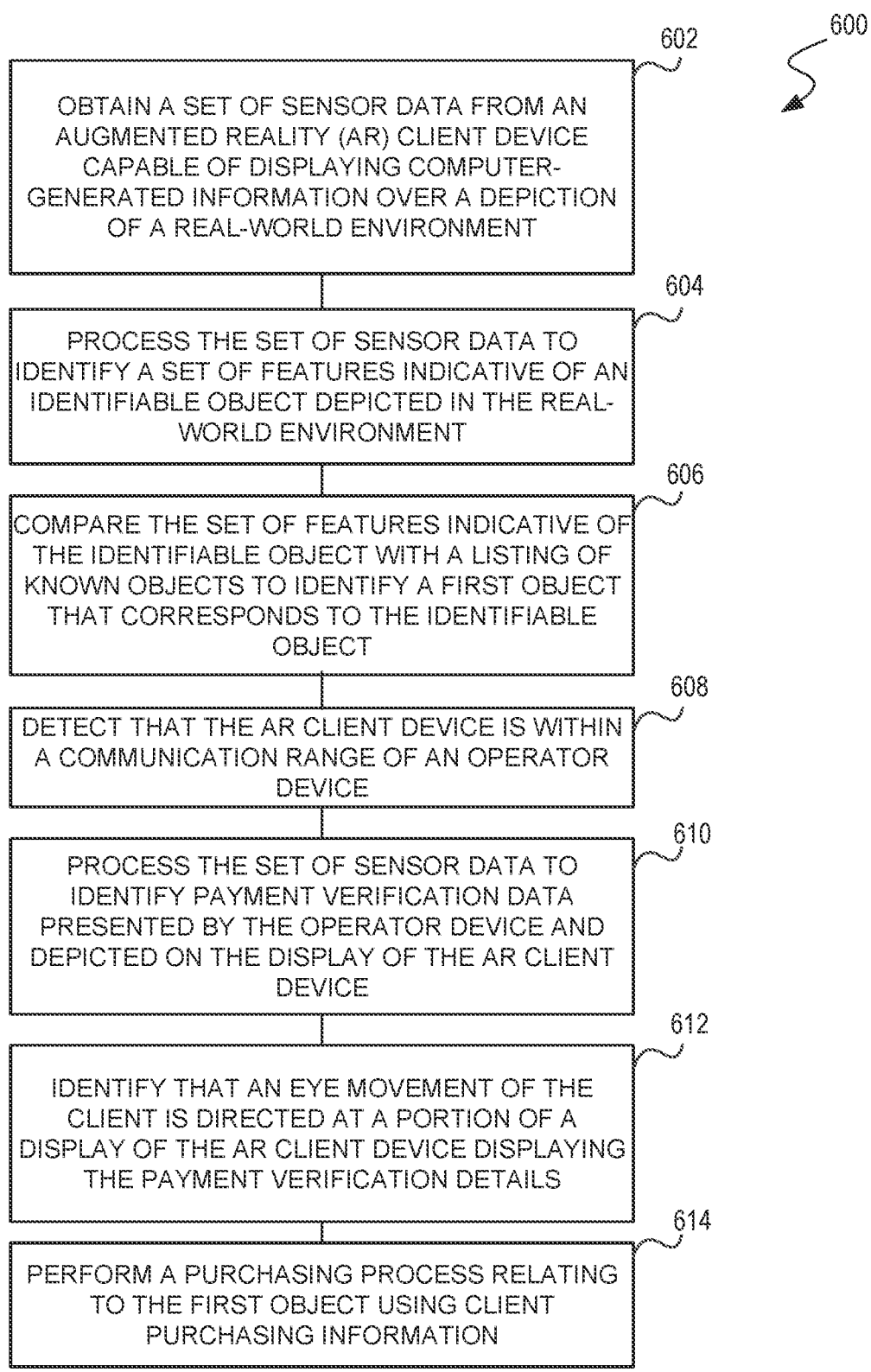
FIG. 6 is a block diagram illustrating a method for authentication of account details provided by operator device by an AR device.

FIG. 6 is a block diagram illustrating a method 600 for authentication of payment details provided by operator device by an AR device. The method can include obtaining a set of sensor data from an Augmented Reality (AR) client device capable of displaying computer-generated information over a depiction of a real-world environment (block 602). The set of sensor data can include data indicative of a real-world environment and/or data indicative of an eye (e.g., iris data, eye movement tracking) of the client operating the AR client device.

The method can include processing the set of sensor data to identify a set of features indicative of an identifiable object depicted in the real-world environment (block 604). The method can also include comparing the set of features indicative of the identifiable object with a listing of known objects to identify a first object that corresponds to the identifiable object (block 606).

The method can include detecting that the AR client device is within a communication range of an operator device (block 608). This can include determining that the AR client device is within a wireless communication range of an operator device (e.g., a checkout device).

The method can include processing the set of sensor data to identify payment verification details presented by the operator device and depicted on a display of the AR client device (block 610). As noted above, payment details can be provided by an operator device that can provide details for purchasing one or more selected objects. The client, via a display (e.g., lens) of the AR client device, can view the display of the operator device and view the payment verification details on the operator device. The system can process the depiction of the real-world environment surrounding the AR client device to identify the payment verification details in the operator device.

In some embodiments, processing the set of sensor data further includes identifying an indicator on a display of the operator device indicating a request to direct the eye movement of the client to the display of the operator device. The indicator can be used by the AR client device to identify that the operator device has provided payment verification details.

In some embodiments, the method can include detecting a payment verification action performed by the client on the AR client device that is confirming payment verification details displayed on the AR client device for purchase of the first object. The payment verification action can include a hand gesture directed at the portion of the display of the AR client device displaying the payment verification details.

In some embodiments, the method can include authenticating an identity of the client operating the AR client device by determining whether received iris data captured by the AR client device is within a threshold similarity to known iris data of the client. The purchasing process relating to the first object can be performed responsive to determining that the received iris data is within the threshold similarity to known iris data.

In some embodiments, the method can include authenticating an identity of the client operating the AR client device by determining whether received biometric features of the client operating the AR client device is within a threshold similarity to known biometric features of an authorized user. The biometric features can include any of: heartbeat characteristics, walking gait characteristics, and a body temperature of the client.

The method can include identifying that an eye movement of a client is directed at a portion of a display of the AR client device displaying the payment verification details (block 612). This can include tracking eye movements of the client operating the AR client device and mapping the movements to identify a directing of the eye movements relative to the display of the AR client device.

The method can include performing a purchasing process relating to the first object using client purchasing information (block 614). This can be performed responsive to identifying that the eye movement of the client is directed at the portion of the display of the AR client device displaying the payment verification details.

In some embodiments, the payment verification data presented by the operator device and depicted on the display of the AR client device includes an indicator requesting the direction of the eye movement of the client. For instance, this can include a set of digital eyes requesting the eye movements of the client to be directed to the display of the operator device.

In some embodiments, the client purchasing information can be received from an application executing on a mobile device in electrical communication with the AR client device.

Secure Payment using Data Specific to an AR-Enabled Device

In some embodiments, a secure payment process can be performed using information unique to an AR-enabled device. Particularly, an AR device can include a unique identifier that can be used by an operator device to identify the AR device and/or the client operating the AR device. The client can confirm payment details via a confirmation action (e.g., waving a hand of the user over a selected item or over a depiction of payment details for the selected item on the display of the AR device).

In many cases, payment options are not touchless/contactless and can include multiple steps, which can cause delays. Further, in many cases, users may have to provide specific account details (e.g., a credit card or card number) and/or remember passcodes to initiate transactions in many retail environments.

AR Glasses can be used for payments in retail stores. Clients can make payments using their digital wallet on their AR glasses. When the client checks out at a register, the payment reader can be able to scan the digital wallet on the AR glasses for the payment.

The AR device can authenticate the customer, once he/she wears the glasses using a Retina scan. If the AR glasses are taken off, re-authentication may be needed. The AR device can include a unique number (e.g., a code, such as a QR code or barcode that is etched into the glass that is not visible to the customer, a wireless signal, etc.) that can be scanned by a reader. In some instances, the AR device can include an embedded chip capable of wirelessly providing the unique number/code to an authorized device.

The AR device can include a unique gesture or recognize a PIN that can be provided by the member, so that can they accept/reject the charge when presented. The AR device can also include information relating to purchasing data (e.g., account numbers) that can be used for purchase of selected items.

As an illustrative example, the client can wear the AR glasses and walk into a retail environment. The AR glasses can authenticate the client after the client enters the retail environment. The client can select a number of items to be checked out and walk up to checkout to purchase the selected items. The operator device can read the unique number associated with the digital wallet from the AR glasses. A payment reader associated with the operator device can send an order total to the AR glasses for confirmation.

The AR glasses can verify that the customer is authenticated and presents an AR image for the client to accept payment. The client can click on virtual button, presented by the AR glasses in front of him/her, to accept payment. The client can be presented with a receipt and checkout is complete.

In some embodiments, if multiple people with AR glasses are detected by a payment reader, the operator device can be presented with all the detected AR glasses. This could occur, for example, when a family is together during checkout. The operator device can confirm the person paying by asking the client and select the client on the payment reader. In some embodiments, where a family goes to a store, a child's AR glasses may be able to only push suggested purchases to parents, who actually approve them via their AR glasses. In some embodiments, when an item is unavailable, the buyer may have an option, via the AR glasses, to have the item shipped to them.

An AR device capable of performing processing tasks as described herein can include a set of sensors capable of obtaining images depicting any of a real-world environment surrounding the AR-enabled device or an iris of a client operating the AR-enabled device. The AR device can also include a display capable of displaying computer-generated information over a depiction of the real-world environment. The AR device can also include a payment device unique to the AR-enabled device and capable of providing client-specific payment information. The AR device can also include a processor capable of performing processing tasks as described herein.

Figure 7:
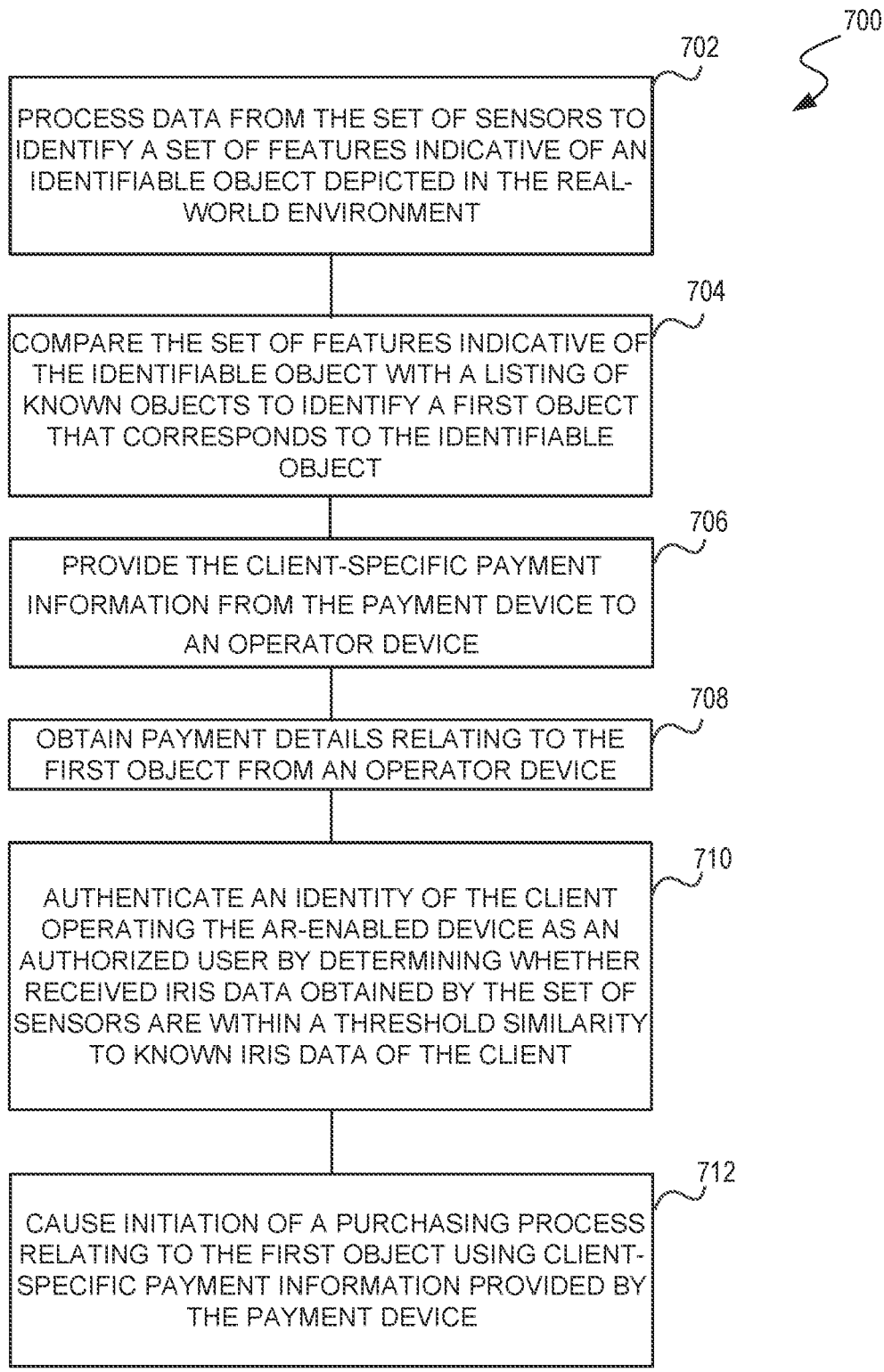
FIG. 7 is a block diagram of an example method for secure transfers using data specific to an AR-enabled device.

FIG. 7 is a block diagram of an example method 700 for secure transfers using data specific to an AR-enabled device. The method can include processing data from the set of sensors to identify a set of features indicative of an identifiable object depicted in the real-world environment (block 702).

The method can include comparing the set of features indicative of the identifiable object with a listing of known objects to identify a first object that corresponds to the identifiable object (block 704).

The method can include providing the client-specific payment information from the payment device to an operator device (block 706). The client-specific payment information can be unique to the client and/or the AR device and can be used by the operator device to identify the AR device/client and provide payment details to the AR device for review by the client.

The method can include obtaining payment details relating to the first object from an operator device (block 708). This can include receiving a message from the operator device including payment details for the selected item(s). The payment details can include a price of the selected items that can be reviewed and accepted by the client.

The method can include authenticating an identity of the client operating the AR-enabled device as an authorized user by determining whether received iris data obtained by the set of sensors are within a threshold similarity to known iris data of the client (block 710).

In some embodiments, the method can include detecting that the client has removed the AR-enabled device. Responsive to detecting that the client has re-engaged the AR-enabled device, the method can include re-authenticating the identity of the client operating the AR-enabled device as the authorized user by determining whether an updated set of received iris data obtained by the set of sensors are within the threshold similarity to known iris data of the client.

In some embodiments, the method can include causing a modification to the display to present the payment details relating to the first object over a portion the depiction of the real-world environment. The method can also include detecting a selection action at the payment details on the portion of the depiction of the real-world environment indicating a confirmation of the payment details. The selection action can include detecting that a focal point of eye movement of the client operating the AR-enabled device is within a threshold proximity to the portion the depiction of the real-world environment including the payment details or detecting a hand gesture located at portion the depiction of the real-world environment including the payment details.

The method can include causing initiation of a purchasing process relating to the first object using client-specific payment information provided by the payment device (block 712). This can be performed responsive to authenticating the identity of the client operating the AR-enabled device as the authorized user.

In some embodiments, the method can include receiving an indication from the operator device that multiple AR-enabled devices are within a proximity of the operator device. The method can also include confirming the identity of the client operating the AR-enabled device by providing the client-specific payment information from the payment device identifying the AR-enabled device as a device causing initiation of the purchasing process.

In some embodiments, the method can include receiving an indication from the operator device that the first object is unavailable for purchase. The method can also include causing initiation of an order request to order the first object to the operator device, wherein the order request includes the client-specific payment information.

Funds Transfer Process Initiated by AR Device

Some embodiments can relate to a funds transfer initiated by an AR-enabled device. The client operating the AR device can initiate a funds transfer process and access banking services through eye tracking, gestures, and/or voice commands through the AR device. The AR device can retrieve and display account information for selection by the client via the AR device. The AR device can then initiate the funds transfer process by providing payment verification details and account information to a payment processing device.

The AR device can be connected to a mobile device or other device for processing. In some instances, the AR device can directly communicate with a server to execute the fund transfer process.

The AR device can start the funds transfer with an iris scan for biometric authentication and then display accounts on the lenses for the consumer to perform the funds transfer. Iris scanning biometrics can measure the unique patterns in the colored circle of your eye to verify and authenticate your identity.

Figure 8:
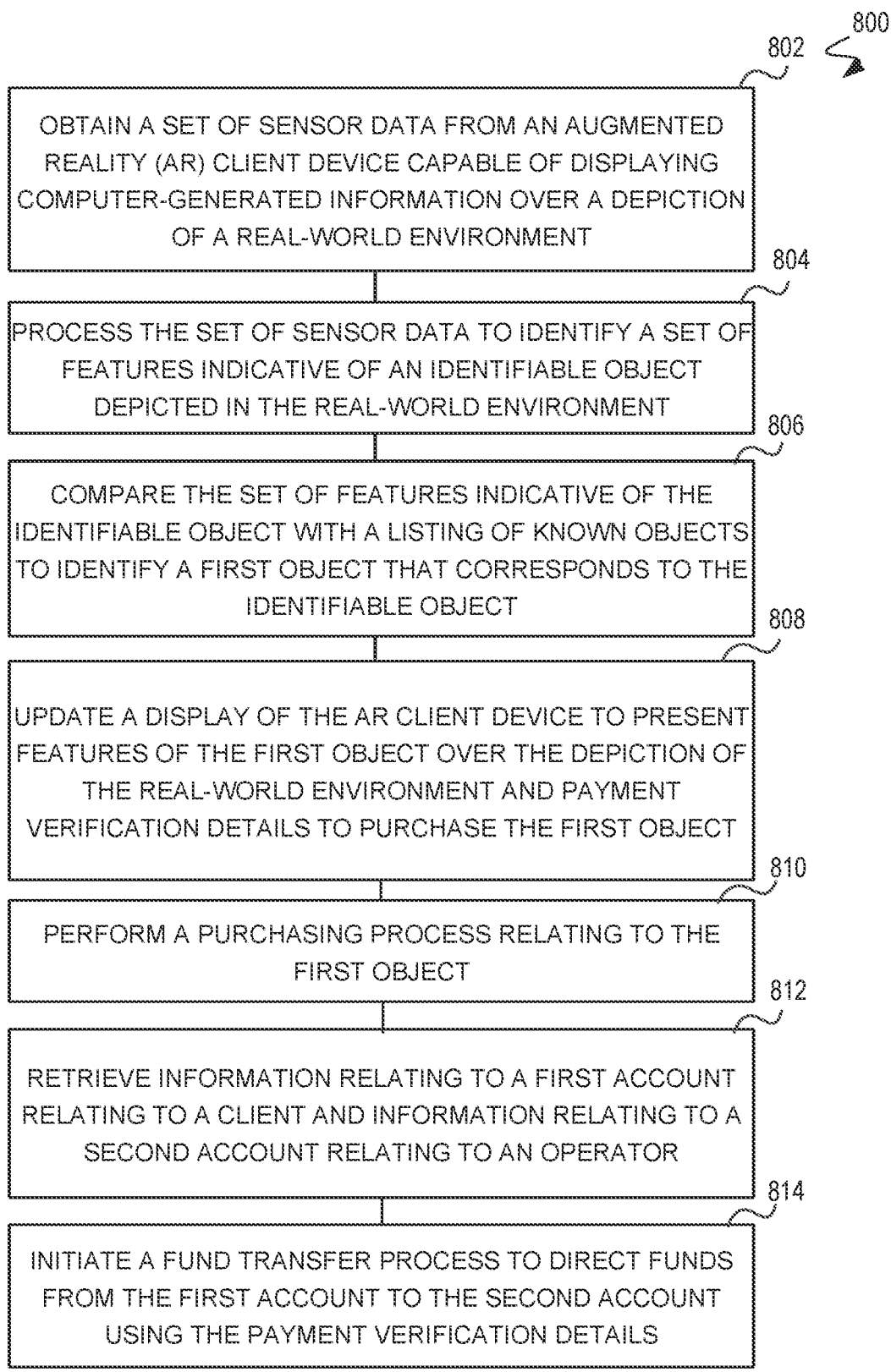
FIG. 8 is an example method for initiating a transfer process using an AR device.

FIG. 8 is an example method 800 for initiating a funds transfer process using an AR device. The method can include obtaining a set of sensor data from an Augmented Reality (AR) client device capable of displaying computer-generated information over a depiction of a real-world environment (block 802).

The method can include processing the set of sensor data to identify a set of features indicative of an identifiable object depicted in the real-world environment (block 804). The method can include comparing the set of features indicative of the identifiable object with a listing of known objects to identify a first object that corresponds to the identifiable object (block 806).

The method can include updating a display of the AR client device to present features of the first object over the depiction of the real-world environment and payment verification details to purchase the first object (block 808). The payment verification details can include a price to purchase the selected objects. The payment verification details can also include an account or accessible link to an account to provide funds to in a funds transfer process.

In some embodiments, the method can include updating the display of the AR client device to present a series of accounts relating to the client and detecting a selection of the first account listed in the series of accounts relating to the client on the display of the AR client device. The selection can include any of identifying that an eye movement of the is directed at the first account for a predetermined amount of time or detecting that a gesture by the client is directed at the first account.

In some embodiments, the payment verification action includes detecting that a focal point of eye movement of the client operating the AR client device is within a threshold proximity to a portion of the display displaying the payment verification details for a predetermined amount of time.

In some embodiments, the payment verification action includes authenticating an identity of the client operating the AR client device by determining whether received iris data captured by the AR client device is within a threshold similarity to known iris data of the client, wherein the purchasing process relating to the first object is performed responsive to determining that the received iris data is within the threshold similarity to known iris data.

The method can include performing a purchasing process relating to the first object (block 810). This can be performed responsive to detecting a payment verification action confirming payment verification details displayed on the display of the AR client device.

The method can include retrieving information relating to a first account relating to a client and information relating to a second account relating to an operator (block 812). The AR device can retrieve accounts relating to the client and the operator for execution of the funds transfer process.

The method can include initiating a fund transfer process to direct funds from the first account to the second account using the payment verification details (block 814). This can include forwarding the information relating to the fund transfer process to an application executing on a mobile device configured to forward the information relating to the fund transfer process to a server configured to complete the fund transfer process.

Example Device Implementation Overview

Figure 9:
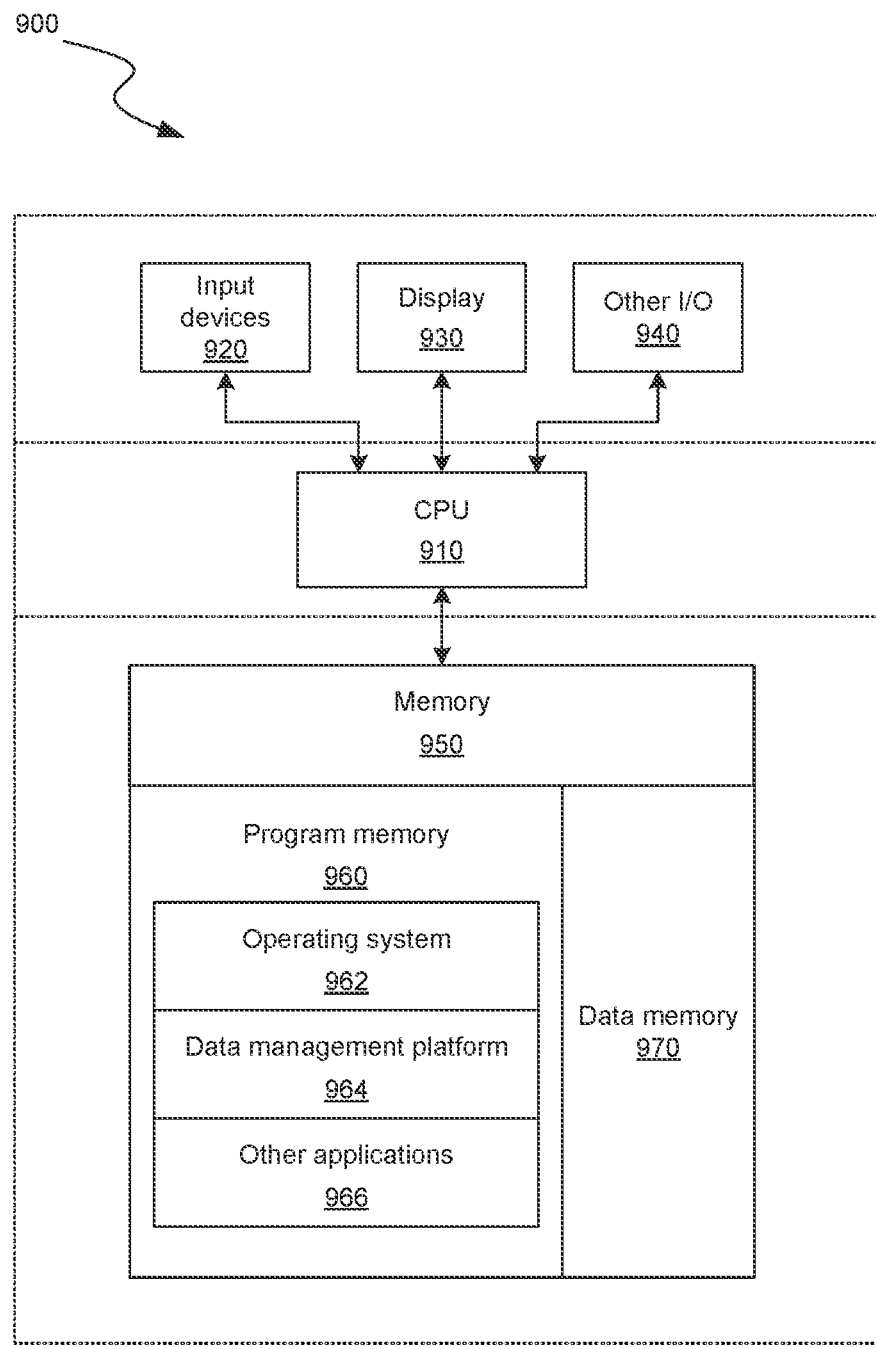
FIG. 9 is a block diagram illustrating an overview of devices on which some implementations of the present embodiments can operate.

FIG. 9 is a block diagram illustrating an overview of devices on which some implementations of the present embodiments can operate. The devices can comprise hardware components of a device 900, such as a client device or network-accessible server system as described herein.

Device 900 can include one or more input devices 920 that provide input to the CPU (processor) 910, notifying it of actions. The actions are typically mediated by a hardware controller that interprets the signals received from the input device and communicates the information to the CPU 910 using a communication protocol. Input devices 920 include, for example, a mouse, a keyboard, a touchscreen, an infrared sensor, a touchpad, a wearable input device, a camera- or image-based input device, a microphone, or other user input devices.

CPU 910 can be a single processing unit or multiple processing units in a device or distributed across multiple devices. CPU 910 can be coupled to other hardware devices, for example, with the use of a bus, such as a PCI bus or SCSI bus. The CPU 910 can communicate with a hardware controller for devices, such as for a display 930. Display 930 can be used to display text and graphics. In some examples, display 930 provides graphical and textual visual feedback to a person operating the device 900. In some implementations, display 930 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 940 can also be coupled to the processor, such as a network card, video card, audio card, USB, FireWire or other external device, camera, printer, speakers, CD-ROM drive, DVD drive, disk drive, or Blu-Ray device.

In some implementations, the device 900 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 900 can utilize the communication device to distribute operations across multiple network devices.

The CPU 910 can have access to a memory 950. A memory can include one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 950 can include program memory 960 that stores programs and software. Memory 950 can also include data memory 970 that can include various information as described in this patent document, which can be provided to the program memory 960 or any element of the device 900. The program memory 960 can include a data management platform 964 and other applications 966 capable of performing the processing tasks as described herein.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in the present Figures and/or in the various embodiments described in this patent document.

Those skilled in the art will appreciate that the components illustrated in FIGS. 1-9 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method for contactless selection and contactless acquisition of one or more real-world objects, the method comprising:
    authenticating, by an Augmented Reality (AR) device worn by a client, an identity of the client in response to entering a retail store;
    obtaining sensor data from the AR device capable of displaying, on a display of the AR device, computer-generated information over a depiction of a real-world environment of the retail store containing the one or more real-world objects, wherein the sensor data is obtained while the AR device is in the real-world environment;
    processing the sensor data to identify a set of features indicative of an identifiable object A) in the real-world environment and B) viewable via the AR device;
    identifying and displaying a first object of the one or more real-world objects that corresponds to the identifiable object, based on the set of features indicative of the identifiable object and a listing of known objects;
    contactlessly selecting, by the client on the AR device, the first object, wherein,
        the contactlessly selecting includes the AR device X) receiving a client selection, by gaze or hand gesture, based on the displaying, of the identified first object and Y) wirelessly providing an indication of the selection to the operator device, and
        the operator device contactlessly receives, from an other AR device, an indication of a selection of a second object;
    contactlessly receiving, from the operator device, payment transfer details for performing a single acquisition process for the first object and the second object;
    displaying the payment transfer details on the display of the AR device;
    detecting a contactless verification action, performed by the client on the AR device, confirming the payment transfer details displayed on the AR device for performing the single acquisition process for the first object and the second object;
    responsive to detecting the verification action confirming the transfer details, performing the single acquisition process for the first object and the second object using client account information.

2. The computer-implemented method of claim 1, wherein detecting the verification action includes identifying that an eye movement is directed at a portion of the display, of the AR device, displaying the transfer details.

3. The computer-implemented method of claim 1, wherein detecting the verification action includes identifying that a hand gesture is directed at a portion of the display, of the AR device, displaying the transfer details.

4. The computer-implemented method of claim 1, wherein detecting the verification action includes detecting an audio confirmation provided by the client.

5. The computer-implemented method of claim 1, wherein the client account information is provided by any of a mobile device in electrical communication with the AR device or a transmitter integrated in the AR device.

6. The computer-implemented method of claim 1, further comprising:
    identifying the transfer details presented on the operator device; and
    displaying the transfer details on the display of the AR device;
    wherein the detection of the verification action includes identifying an eye movement directed at a portion of the display, of the AR device, depicting the transfer details.

7. The computer-implemented method of claim 1, further comprising:
    receiving iris data captured by the AR device;
    wherein the authenticating the identify of the client comprises determining whether the iris data is within a threshold similarity to known iris data of the client; and
    wherein the single acquisition process relating to the first object and the second object is allowed responsive to determining that the received iris data is within the threshold similarity to known iris data.

8. The computer-implemented method of claim 1,
    wherein the AR device includes a client-specific identifier unique to the client, and
    wherein the operator device is configured to retrieve the client account information based on the client-specific identifier of the AR client device.

9. The computer-implemented method of claim 1, wherein performing the single acquisition process further comprises:
    retrieving receipt details from the operator device in electronic communication with the AR device;
    identifying the client account information from a micro-payment device embedded in the AR device; and
    initiating a transfer process using the transfer details to transfer a payment from a first account associated with the client account information to a second account derived from the receipt details.

10. The method of claim 1, wherein the second object is contactlessly selected via interactions between the other AR device and an other client that wears the other AR device.

11. The method of claim 10, wherein the other AR device authenticates the other client, and the single acquisition process is allowed based on the authenticating the other client.

12. A non-transitory computer-readable storage medium storing instructions that, when executed by a computing system, cause the computing system to perform a process for contactless selection and contactless acquisition of one or more real-world objects, comprising:
   authenticating, by an Augmented Reality (AR) device worn by a client, an identity of the client in response to entering a retail store;
   obtaining sensor data from the AR device capable of displaying, on a display of the AR device, computer-generated information over a depiction of a real-world environment of the retail store containing the one or more real-world objects, wherein the sensor data is obtained while the AR device is in the real-world environment;
   processing the sensor data to identify a set of features indicative of an identifiable object A) in the real-world environment and B) viewable via the AR device;
   identifying and displaying a first object of the one or more real-world objects that corresponds to the identifiable object, based on the set of features indicative of the identifiable object and a listing of known objects;
   contactlessly selecting, by the client on the AR device, the first object, wherein,
      the contactlessly selecting includes the AR device X) receiving a client selection, by gaze or hand gesture, based on the displaying, of the identified first object and Y) wirelessly providing an indication of the selection to the operator device, and
      the operator device contactlessly receives, from an other AR device, an indication of a selection of a second object;
   contactlessly receiving, from the operator device, payment transfer details for performing a single acquisition process for the first object and the second object;
   displaying the payment transfer details on the display of the AR device;
   detecting a contactless verification action, performed by the client on the AR device, confirming the payment transfer details displayed on the AR device for performing the single acquisition process for the first object and the second object;
   responsive to detecting the verification action confirming the transfer details, performing the single acquisition process for the first object and the second object using client account information.

13. The non-transitory computer-readable storage medium of claim 12, wherein detecting the verification action includes one or more of: identifying that an eye movement is directed at a portion of the display, of the AR device, displaying the transfer details, identifying that a hand gesture is directed at a portion of the display, of the AR device, displaying the transfer details, or detecting the verification action includes detecting an audio confirmation provided by the client.

14. The non-transitory computer-readable storage medium of claim 12, wherein the client account information is provided by any of a mobile device in electrical communication with the AR device or a transmitter integrated in the AR device.

15. The non-transitory computer-readable storage medium of claim 12, further comprising:
   identifying the transfer details presented on the operator device; and
   displaying the transfer details on the display of the AR device;
   wherein the detection of the verification action includes identifying an eye movement directed at a portion of the display, of the AR device, depicting the transfer details.

16. The non-transitory computer-readable storage medium of claim 12,
   wherein the AR device includes a client-specific identifier unique to the client, and
   wherein the operator device is configured to retrieve the client account information based on the client-specific identifier of the AR client device.

17. The non-transitory computer-readable storage medium of claim 12, wherein performing the single acquisition process further comprises:
   retrieving receipt details from the operator device in electronic communication with the AR device;
   identifying the client account information from a micro-payment device embedded in the AR device; and
   initiating a transfer process using the transfer details to transfer a payment from a first account associated with the client account information to a second account derived from the receipt details.

18. A computer system comprising:
   one or more processors; and
   one or more memories storing instructions that, when executed by a computing system, cause the computing system to perform a process for contactless selection and contactless acquisition of one or more real-world objects, comprising:
      authenticating, by an Augmented Reality (AR) device worn by a client, an identity of the client in response to entering a retail store;
      obtaining sensor data from the AR device capable of displaying, on a display of the AR device, computer-generated information over a depiction of a real-world environment of the retail store containing the one or more real-world objects, wherein the sensor data is obtained while the AR device is in the real-world environment;
      processing the sensor data to identify a set of features indicative of an identifiable object A) in the real-world environment and B) viewable via the AR device;
      identifying and displaying a first object of the one or more real-world objects that corresponds to the identifiable object, based on the set of features indicative of the identifiable object and a listing of known objects;
      contactlessly selecting, by the client on the AR device, the first object, wherein,
         the contactlessly selecting includes the AR device X) receiving a client selection, by gaze or hand gesture, based on the displaying, of the identified first object and Y) wirelessly providing an indication of the selection to the operator device, and
         the operator device contactlessly receives, from an other AR device, an indication of a selection of a second object;

contactlessly receiving, from the operator device, payment transfer details for performing a single acquisition process for the first object and the second object;

displaying the payment transfer details on the display of the AR device;

detecting a contactless verification action, performed by the client on the AR device, confirming the payment transfer details displayed on the AR device for performing the single acquisition process for the first object and the second object;

responsive to detecting the verification action confirming the transfer details, performing the single acquisition process for the first object and the second object using client account information.

19. The computing system of claim 18, wherein the process further comprises:

receiving iris data captured by the AR device;

wherein the authenticating the identify of the client comprises determining whether the iris data is within a threshold similarity to known iris data of the client;

wherein the AR device includes a client-specific identifier unique to the client; and wherein an operator device is configured to retrieve the client account information based on the client specific identifier of the AR device and the authentication of the identity of the client.

20. The computing system of claim 18, wherein the process further comprises:

retrieving receipt details from the operator device in electronic communication with the AR device;

identifying the client account information from a micropayment device embedded in the AR device; and initiating a transfer process using the transfer details to transfer a payment from a first account associated with the client account information to a second account derived from the receipt details.

\* \* \* \* \*